US008428038B1

(12) United States Patent
Buttles

(10) Patent No.: US 8,428,038 B1
(45) Date of Patent: Apr. 23, 2013

(54) COMMUNICATION DEVICES FOR NETWORK-HOPPING COMMUNICATIONS AND METHODS OF NETWORK-HOPPING COMMUNICATIONS

(75) Inventor: John W. Buttles, Idaho Falls, ID (US)

(73) Assignee: U.S. Department of Energy, Washington, DC (US)

(*) Notice: Subject to any disclaimer, the term of this patent is extended or adjusted under 35 U.S.C. 154(b) by 247 days.

(21) Appl. No.: 12/983,395

(22) Filed: Jan. 3, 2011

Related U.S. Application Data

(63) Continuation-in-part of application No. 12/370,854, filed on Feb. 13, 2009, now Pat. No. 8,081,624.

(51) Int. Cl.
*H04W 4/00* (2009.01)

(52) U.S. Cl.
USPC .......................................... 370/338

(58) Field of Classification Search ............ 370/203, 370/204–215, 229–240, 310–394, 395.1, 370/395.3, 395.4, 395.41, 395.42, 395.5, 370/395.52, 395.53, 412–421, 431–529, 370/523–520
See application file for complete search history.

(56) References Cited

U.S. PATENT DOCUMENTS

| | | | | |
|---|---|---|---|---|
| 5,978,679 A | * | 11/1999 | Agre | 455/442 |
| 6,028,885 A | * | 2/2000 | Minarik et al. | 375/135 |
| 6,965,585 B2 | * | 11/2005 | Grilli et al. | 370/331 |
| 2003/0050055 A1 | * | 3/2003 | Ting et al. | 455/419 |
| 2004/0052372 A1 | * | 3/2004 | Jakoubek | 380/255 |
| 2005/0182847 A1 | * | 8/2005 | Jawad Pirzada et al. | 709/233 |
| 2008/0002657 A1 | * | 1/2008 | Pisek et al. | 370/342 |
| 2009/0180451 A1 | * | 7/2009 | Alpert et al. | 370/338 |
| 2009/0310591 A1 | * | 12/2009 | Feher | 370/347 |
| 2011/0075709 A1 | * | 3/2011 | Feher | 375/146 |

FOREIGN PATENT DOCUMENTS

WO   00/24139   4/2000

OTHER PUBLICATIONS

Display Blog, "Paragon Wireless Hipi 2200: GSM, VoIP Dual-Mode Mobile Phone, "Wordpress.com, Oct. 4, 2006, 3 pages.
Valich, Theo, "Intel comms chips switches wireless protocols on the fly," Jun. 22, 2007, www.theinquierer.net, 3 pages.
Wikipedia, Generic Access Network, en.wikipedia.org, Jul. 9, 2008, 4 pages.

* cited by examiner

*Primary Examiner* — Jung-Jen Liu
(74) *Attorney, Agent, or Firm* — Michael J. Dobbs; Daniel D. Park; John T. Lucas

(57) ABSTRACT

Wireless communication devices include a software-defined radio coupled to processing circuitry. The system controller is configured to execute computer programming code. Storage media is coupled to the system controller and includes computer programming code configured to cause the system controller to configure and reconfigure the software-defined radio to operate on each of a plurality of communication networks according to a selected sequence. Methods for communicating with a wireless device and methods of wireless network-hopping are also disclosed.

22 Claims, 9 Drawing Sheets

COMMUNICATION DEVICES FOR NETWORK-HOPPING COMMUNICATIONS AND METHODS OF NETWORK-HOPPING COMMUNICATIONS

RELATED APPLICATIONS

This U.S. non-provisional application is a continuation-in-part application of and claims priority to U.S. non-provisional application Ser. No. 12/370,854 filed Feb. 13, 2009, now U.S. Pat. No. 8,081,624 which is hereby fully incorporated by reference in its entirety.

GOVERNMENT RIGHTS STATEMENT

The United States Government has certain rights in this invention pursuant to Contract No. DE-AC07-05-ID14517 between the United States Department of Energy and Battelle Energy Alliance, LLC.

TECHNICAL FIELD

The present invention relates generally to communication methods, devices and systems. More particularly, embodiments of the present invention relate to methods and devices for communicating using a plurality of wireless networks.

BACKGROUND

Conventional wireless communications employ one of several different wireless technology standards (e.g., GSM, CDMA, WiFi™, etc.) for exchanging voice and data information. Typically, modern devices employ encryption techniques which encode communication traffic between a wireless device and the cell site. Although encryption is fairly successful, eventually the technology standard employed to transmit the communications may be learned and the encryption may be compromised or at least disrupted. For example, Global Security Solutions located in Niagara Falls, Ontario advertises a cellular telephone interceptor for monitoring and intercepting GSM and TDMA cellular traffic, including encrypted data.

Thus, although encrypted digital wireless communications are significantly more secure than historic wireless communications, the communications can be intercepted and decoded over time. Thus, it would be advantageous to provide devices and methods of communication capable of improving the security of wireless communications between wireless devices.

BRIEF SUMMARY

Various embodiments of the present invention comprise wireless communication devices configured to communicate on a plurality of wireless communication networks. In one or more embodiments, a wireless communication device may comprise a software-defined radio coupled to a system controller configured to execute computer programming code. Storage media may be coupled to the system controller and may comprise computer programming code. In one or more embodiments, the programming code may be configured to cause the system controller to configure and reconfigure the software-defined radio to operate using each of a plurality of communication networks according to a selected sequence.

Further embodiments of the invention comprise methods for communicating data. One or more embodiments of such methods may comprise communicating data to or from a wireless device for a predetermined amount of time using a first communication network. Subsequently, data may be communicated to or from the wireless device using a second, different communication network for another predetermined amount of time.

Still other embodiments comprise methods of wireless network-hopping. One or more embodiments of such methods may comprise establishing a connection between at least two communication devices on a plurality of wireless networks. Data may be transmitted between the at least two communication devices using a first wireless network for a predetermined amount of time. Subsequently, data may be transmitted between the at least two communication devices using a second wireless network for another predetermined amount of time.

A plurality of software-defined radios may also be used. In one embodiment, each software-defined radio remains connected to a particular wireless network during a communications session. In yet another embodiment, once connected, one or more of the software-defined radios change its wireless network connection during a communications session.

DETAILED DESCRIPTION

Figure 1:
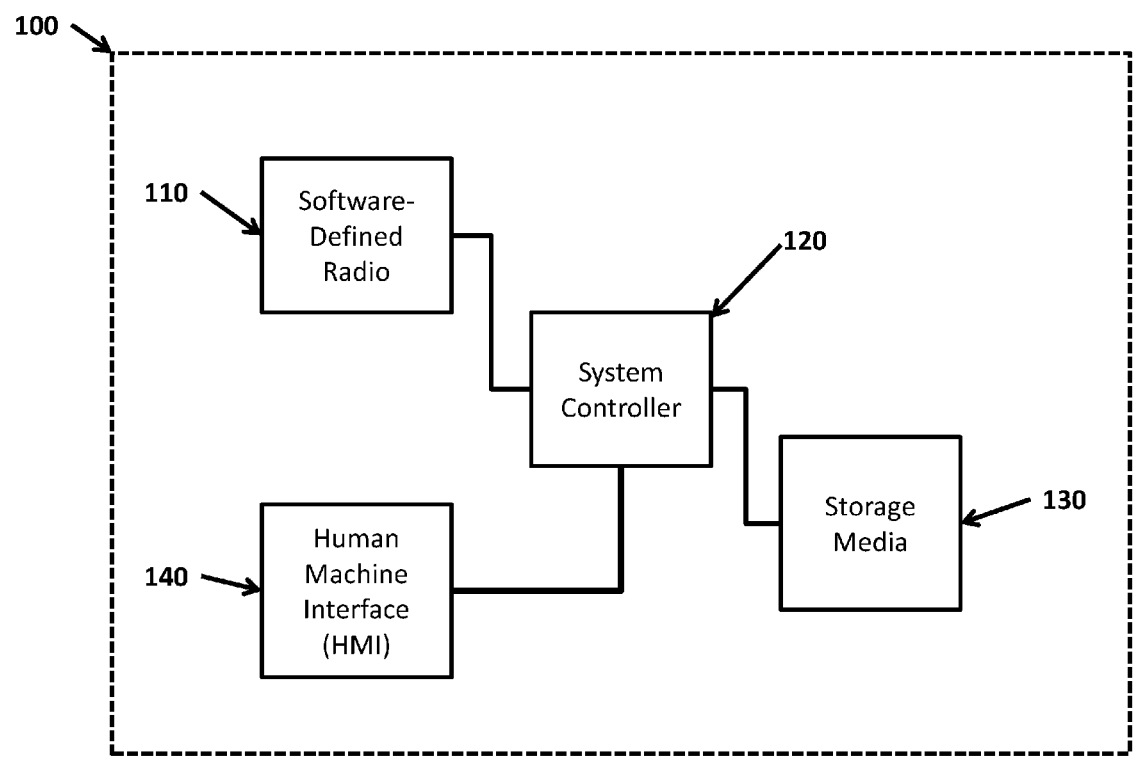
FIG. 1 is a block diagram of a configuration for a wireless communication device, according to at least one embodiment.

In the following detailed description, circuits and functions may be shown in block diagram form in order not to obscure the various embodiments of the present invention in unnecessary detail. Additionally, block definitions and partitioning of logic between various blocks as depicted is non-limiting, and comprise examples of only specific embodiments. It will be readily apparent to one of ordinary skill in the art that the present invention may be practiced in a variety of embodiments implementing numerous other partitioning solutions.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process is terminated when its acts are completed. A process may correspond to a method, a function, a procedure, a subroutine, a subprogram, etc. Furthermore, the methods disclosed herein may be implemented in hardware, software, firmware or combinations thereof.

In the following description, certain terminology is used to describe certain features of one or more embodiments of the invention. For instance, the term "network," which may also be referred to herein as a "wireless network," refers to a communication network using a particular communication technology and a particular communication provider. A communication technology refers to a communication standard or protocol used for conducting communications between two or more wireless devices. By way of example and not limitation, a communication technology may comprise wireless technologies such as GSM, CDMA, WiFi, WiMAX, LTE, CDMA2000, WCDMA, TD-SCDMA, WiBRO, iDen, etc. A communication provider comprises a provider of the communication technology to the user. By way of example and not limitation, some current providers of various communication technologies in the United States of America comprise AT&T™, SPRINT™, VERIZON WIRELESS™, T-MOBILE™, etc. Furthermore, by way of example and not limitation, some providers may also include WIFI™ service at a residence, business office, public place, or other dwelling, providing a connection to a wireless network, and more preferably, a connection to the internet. Thus, using a particular network may refer, for example, to using GSM over AT&T™ or CDMA over VERIZON WIRELESS™, etc. As used herein, a change in at least one of the communication technology or the communication provider is considered a different network. These examples of communication technologies and communication providers are included for illustration only, and additional and/or alternative communication technologies and/or providers may be employed.

During a communication session, a wireless device connects to a remote wireless device using a particular communications technology. Once connected, the wireless device establishes a connection by: performing any necessary "handshaking," determining a common set of accepted protocols, authenticating, authorizing, or combination thereof. Once a connection is established, preferably all that is necessary is an occasional keep-alive signal to prevent the connection from being terminated. After a connection is established, the wireless devices may transmit, receive, or a combination thereof data as data packets. Preferably, a data packet is in a format defined by the applicable communications technology, including any necessary headers with the data to be sent. As defined by the applicable communications technology, preferably large data sets to be transmitted, received, or a combination thereof, are split up into a plurality of data packets. At the end of the communication session, preferably an "end-of-transmission" signal is sent as defined by the applicable communications technology. In the alternative, the wireless communications device may simply disconnect, and afterwards the remote wireless communications device will simply disconnect do to a lack of keep-alive or response.

FIG. 1

Various embodiments of the present invention are directed toward embodiments of a wireless device configured for secure wireless communications. FIG. 1 illustrates a block diagram according to at least one embodiment. A wireless device 100 may include a software-defined radio 110, system controller 120, storage media 130, and a human-machine interface 140. Preferably, the system controller 120 is connected to each of the software-defined radio 110, human-machine interface 140, and storage media 130. Other arrangements within the scope of the invention are contemplated, including more, fewer and/or alternative components.

The software-defined radio 110 comprises wireless communication circuitry capable of being configured with software to perform the functions of a communication device configured to operate on a particular network. Using software, the software-defined radio 110 may be reconfigured on the fly to operate on any of a plurality of networks. The software radio is a device capable of communicating with a plurality of communication technologies depending on its software programming. For example, the software radio may be implemented using a Computer, Microcontroller, ASIC (Application Specific Integrated Circuit)), FPGAs (Field Programmable Gate Array), ADC (Analog-to-digital converter), DAC (digital to analog converter), DSP (digital signal processor), amplifiers, digital or analog filters, or a combination thereof. In a preferred embodiment, the software-defined radio 110 comprises the SB3000® chip by Sandbridge Technologies of Tarrytown, N.Y.

In at least some embodiments, the system controller 120 may be arranged to obtain, process and/or transmit data, control data access and storage, issue commands, and control other desired operations. For example, in at least some embodiments the system controller 120 may be coupled to the software-defined radio 110 and arranged to configure and reconfigure the software-defined radio 110 to operate on each of a plurality of networks according to a set sequence. The system controller 120 may comprise circuitry configured to implement desired programming provided by appropriate media in at least one embodiment. For example, the system controller 120 may be implemented as one or more of a processor, a controller, a plurality of processors and/or other structure configured to execute executable instructions including, for example, software and/or firmware instructions, and/or hardware circuitry. Embodiments of system controller 120 include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. Preferably, the system controller 120 is a microcontroller, more preferably the microcontroller sold by ARM under the trademark CORTEX-A9. These examples of system controller 120 are for illustration and other suitable configurations are also contemplated and may also be employed.

The storage media 130 is configured to store programming such as executable code or instructions (e.g., software, firmware, or a combination thereof), electronic data, databases, or other digital information and may include processor-usable media. By way of example and not limitation, the storage media 130 may include executable code, which may also be characterized as instructions, for configuring the software-defined radio 110 to operate on each of the wireless technologies for each provider. A storage media 130 may be any available media that can be accessed by a general purpose or special purpose computer. By way of example and not limitation, a storage medium may comprise one or more devices for storing data, including read-only memory (ROM), random access memory (RAM), magnetic disk storage mediums, optical storage mediums, flash memory devices, solid state hard disk, other computer-readable mediums for storing information, and combinations thereof.

Processor-usable media may be embodied in any computer program product(s) or article of manufacture(s) which can contain, store, or maintain computer programming code, data and/or digital information for use by or in connection with an instruction execution system including the system controller in the exemplary embodiment. For example, suitable processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information. At least some embodiments described herein may be implemented using programming code stored within appropriate storage media described above and configured to control appropriate processing circuitry. Preferably, the storage media 130 is flash memory, ram, or rom within or external to the system controller 120. In one embodiment, the storage media 130 is flash memory storage within the system controller 120, preferably as part of a computer, microcontroller, or system-on-a-chip.

The human-machine interface 140 comprises means for interaction between the wireless device 100 and a user. By way of example and not limitation, the human-machine interface 140 may comprise a display screen, a key pad, a touch screen, a microphone, a speaker or combinations thereof coupled to the system controller 120. The human-machine interface 140 may be integral to the wireless device 100, or at least some portions of the human-machine interface 140 may be separate from, but connected to the wireless device 100. By way of example and not limitation, a key pad or display screen may be coupled to the wireless device 100 wirelessly (e.g., Bluetooth, WIFI™) or by physical wires. Preferably, the human-machine interface 140 comprises a LCD, LED or other display device, a keypad, a microphone, and a speaker. In one alternative embodiment, the human-machine interface 140 comprises a touch screen LCD or LED display device, whereby the user may input data using the touch-sensitive touch screen and may receive data from the touch screen display.

FIG. 2

Figure 2:
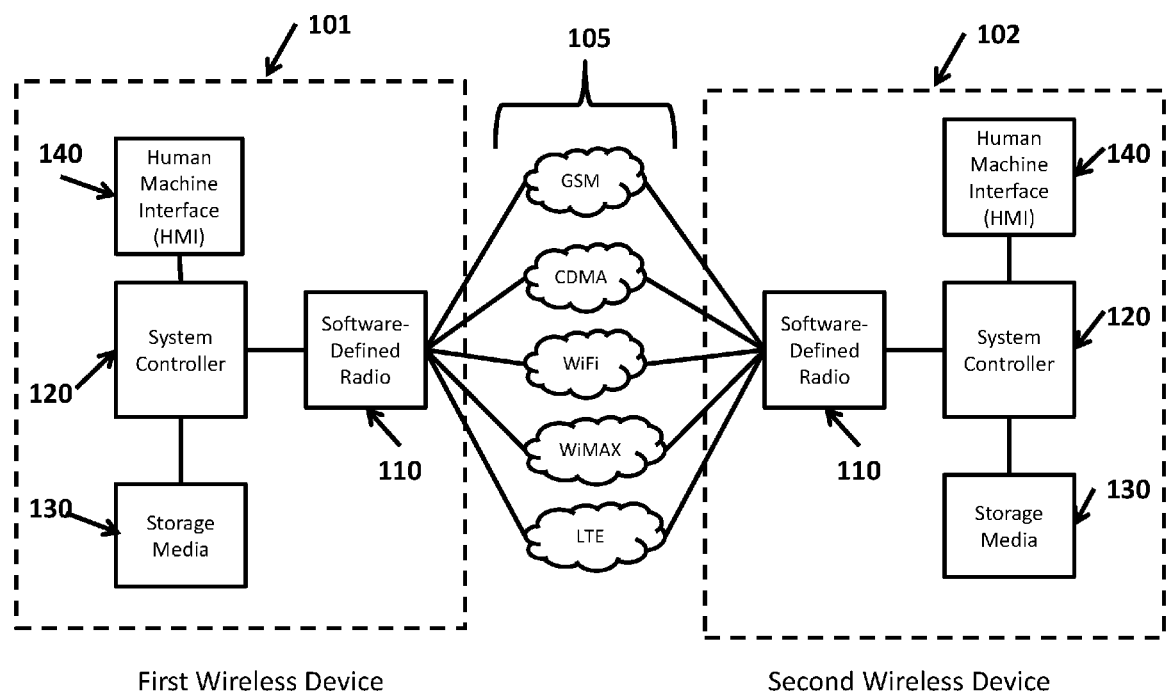
FIG. 2 is a flow diagram illustrating communication operation and components according to at least one embodiment.

Referring to FIG. 2, communication of data between a plurality of wireless devices is shown and described according to at least one embodiment. For simplicity only a first wireless device 101 and a second wireless device 102 are shown, however any number of wireless devices may be used in various configurations. Both the first wireless device 101 and the second wireless device 102 each comprise a corresponding software-defined radio 110, system controller 120, storage media 130, and human machine interface (HMI) 140, as described above. Initially, the wireless devices (the first wireless device 101 and the second wireless device 102) are each configured to communicate over a plurality of wireless networks 105 through the corresponding software-defined radio 110. For example, the system controller 120 of each wireless device may implement programming comprising information relating to the plurality of technologies and providers comprising the plurality of networks 105 with which the wireless devices may be configured to operate. Such programming may comprise one or more available network tables.

The one or more available network tables may include all of the network-specific information necessary for the corresponding wireless device to authenticate and identify on each of the plurality of networks 105. By way of example and not limitation, the available network table may comprise any combination of one or more items of network-specific information including the Integrated Circuit Card ID (ICCID), the International Mobile Subscriber Identity (IMSI), authentication key (Ki), Local Area Identity (LAI), as well as other configuration details, network IDs, place call commands, timing requirements for transmitting keep-alive commands for remaining registered on each network, and any other specific commands necessary to allow the corresponding wireless device to operate on each of the plurality of networks 105. For example, the one or more available network tables may comprise all the information typically found on a conventional subscriber identification module (SIM) card used for global system for mobile (GSM) enabled communication devices.

The system controller 120 of each wireless device may implement the programming relating to the one or more available network tables to configure its software-defined radio 110 to operate on each of the available networks and to communicate the necessary commands to establish a connection with each of the available networks. The corresponding system controller of each wireless device may store a list of the available networks into an accepted available network table. In the non-limiting example illustrated in FIG. 2, each wireless device may establish a connection with each of the networks comprising one or more providers employing wireless technologies including GSM, CDMA, WIFI™, WiMAX and LTE.

In one embodiment, the system controller 120 of the first wireless device 101 may comprise a wireless network-hopping (WNH) call table comprising a predefined and previously ordered listing of the networks which will be employed when the first wireless device 101 is communicating with another wireless device (e.g. the second wireless device 102). In other words, the first wireless device 101 and the second wireless device 102 are configured to communicate with each other using a wireless network-hopping technique as described herein. Both the first wireless device 101 and the second wireless device 102 are preprogrammed with at least one wireless network-hopping call table unique to communications between the first wireless device 101 and the second wireless device 102, which defines the networks, network order and timing of the network-hopping sequence when the two devices are communicating. The wireless network-hopping call table may be configured to include one sequence or several sequences as well as a plurality of timing configurations. Indeed, different permutations of the wireless network-hopping call table may include multiple sequences and multiple variations of the multiple sequences. The wireless network-hopping call table is preferably preloaded into the system controller 120 or the storage media 130 of both the first wireless device 101 and the second wireless device 102 and is the same for both devices. Furthermore, the wireless network-hopping call table associated between a first wireless device 101 and a second wireless device 102 may differ from the wireless network-hopping call table associated between the first wireless device 101 and a third wireless device (not shown in FIG. 2 for simplicity).

Once the software-defined radio 110 of each wireless device has established a connection with one or more of the plurality of networks, a call may be established between one or more wireless devices. For example, a user of the first wireless device 101 may establish a wireless communication by inputting a unique identifier into the human-machine interface 140 of the first wireless device which identifies the intended endpoint, such as a telephone number. If the communication is a wireless network-hopping communication, each wireless device may have a plurality of telephone numbers or other identifiers associated therewith. For example, a wireless device configured to operate on five different networks may comprise five different identifiers, such as telephone numbers, identifying the wireless device as the endpoint over each unique network. Thus, a wireless device may be configured to include all the information for a wireless network-hopping communication for each contact, including all of the unique identifiers.

By way of example and not limitation, the first wireless device 101, may select a contact, (e.g. the second wireless device 102), from a list of contacts stored on the first wireless device 101. Selecting the contact may cause the system controller 120 of the first wireless device 101 to initiate conventional connection procedures over each of the networks in the wireless network-hopping call table associated with the second wireless device 102. In particular, the system controller 120 of the first wireless device 101 may configure the software-defined radio 110 of the first wireless device 101 to communicate through each of the networks in the wireless network-hopping call table to attempt to initiate a call with the second wireless device 102. For example, the software-defined radio 110 of the first wireless device 101 may dial the number associated with the second wireless device 102 on a GSM network. If a connection is unsuccessful, then software-defined radio 110 of the first wireless device 101 may be reconfigured by commands from the system controller 120 of the first wireless device 101 to dial a different number associated with the second wireless device 102 on the CDMA network. Each network may be employed until a connection between the first wireless device 101 and the second wireless device 102 is established. Once one of the available networks from the wireless network-hopping call table is successful in connecting the wireless devices (the first wireless device 101 and the second wireless device 102), each wireless network-hopping call table associated with its corresponding wireless device may be synchronized to identify which of the networks are actually available to the wireless devices. With the wireless network-hopping call tables synchronized, each system controller 120 may reconfigure their respective software-defined radios 110 at least substantially simultaneously to switch to each of the remaining networks for establishing communications between the first wireless device 101 and the second wireless device 102 on each of the plurality of networks.

As each wireless device is establishing communications over the plurality of networks, each system controller 120 is configured to keep communications open through each previously connected network. Wireless networks conventionally comprise some form of keep-alive commands which are intended to keep channels open for a communication if the connection is temporarily lost. If communications over the network cease for a predetermined amount of time, the networks may be configured to disconnect the call to allow other users to use the network. The keep-alive commands may be sent periodically by the software-defined radio 110 to one or more of their respective networks in order to prevent the corresponding connection from disconnected due to a lack of communication. In at least some embodiments, one or more system controllers 120 may include programming comprising a timer configured to determine how often to transmit a keep-alive command and configuration details for configuring the corresponding software-defined radio 110 to transmit the keep-alive command to each connected network to keep the wireless device registered with the network.

Once the connection between the wireless devices is established for each of the plurality of networks, the wireless devices may commence in transmitting and receiving data. Data may be input through the corresponding human-machine interface 140 of the wireless device by a user. By way of example and not limitation, data may be input in the form of audio, video, text messages, digital data such as a file transfer, or combinations thereof. In at least some embodiments, the wireless devices may be configured to encrypt the input data with some form of data encryption. For example, the system controller 120 may be configured to implement some form of encryption. Such encryption is optional and in some embodiments data encryption may not be employed. In one embodiment, the encryption uses Data Encryption Standard (DES), the Advanced Encryption Standard (AES), KASUMI, MISTY1, RC4, WEP, WPA, WPA2, etc. and combinations thereof.

The input data from the human interface machine interface 140 of a wireless device is communicated to the corresponding system controller 120, which communicates this input data to the corresponding software-defined radio 110. The system controller 120 also provides instructions to the corresponding software-defined radio 110, according to the wireless network-hopping call table, regarding which network the software-defined radio 110 should use to transmit the input data. The system controller 120 may reconfigure the software-defined radio 110 at intervals, in accordance with the wireless network-hopping call table, to switch between the available networks. By way of example and not limitation, a first portion of input data may be communicated using the software-defined radio configured to transmit the data using a GSM network for a predefined interval or period of time. The system controller may then instruct the software-defined radio 110 to transmit additional portions of the input data using a WIFI™ network, for example, for another predefined period of time. In a similar manner, the system controller 120 may instruct the software-defined radio 110 to transmit data using each of the various available networks as defined by the wireless network-hopping call table. Preferably, data is stored, buffered, or a combination thereof in the storage media 130, while it is transmitted.

The first device 101 is synchronized with the second wireless device 102, through the wireless network-hopping call table, such that the software-defined radio 110 of the second wireless device 102 is configured to receive the transmitted data over the same network used by the first wireless device 101. The system controller 120 of the second wireless device 102 is coupled to the software-defined radio 110 of the second wireless device 102 and configured to instruct the software-defined radio 110 of the second wireless device 102 which network to use for transmitting and receiving data. For example, if the first wireless device 101 is configured to transmit, receive, or a combination thereof data using a GSM network for a predefined interval, then the second wireless device 102 will be configured to transmit, receive, or a combination thereof data using the same GSM network of the first wireless device 101 for the same predefined interval. Preferably, both the first wireless device 101 and the second wireless device 102 are each configured to both transmit, receive, or a combination thereof data using a wireless network for a predefined interval. When the first wireless device 101 changes to another network, the second wireless device 102 will change to the same network at substantially the same time. In such a manner data is streamed substantially continuously, even though the wireless network employed may be continuously changing.

The data received by a software-defined radio 110 is communicated to its corresponding system controller 120 which may process the received data into a suitable format for use by the wireless device's human-machine interface 140. Processing the received data into a suitable format may include decrypting the data in those embodiments in which the data has been encrypted. The data may then be output to a user, through the corresponding human-machine interface 140.

Figure 3:
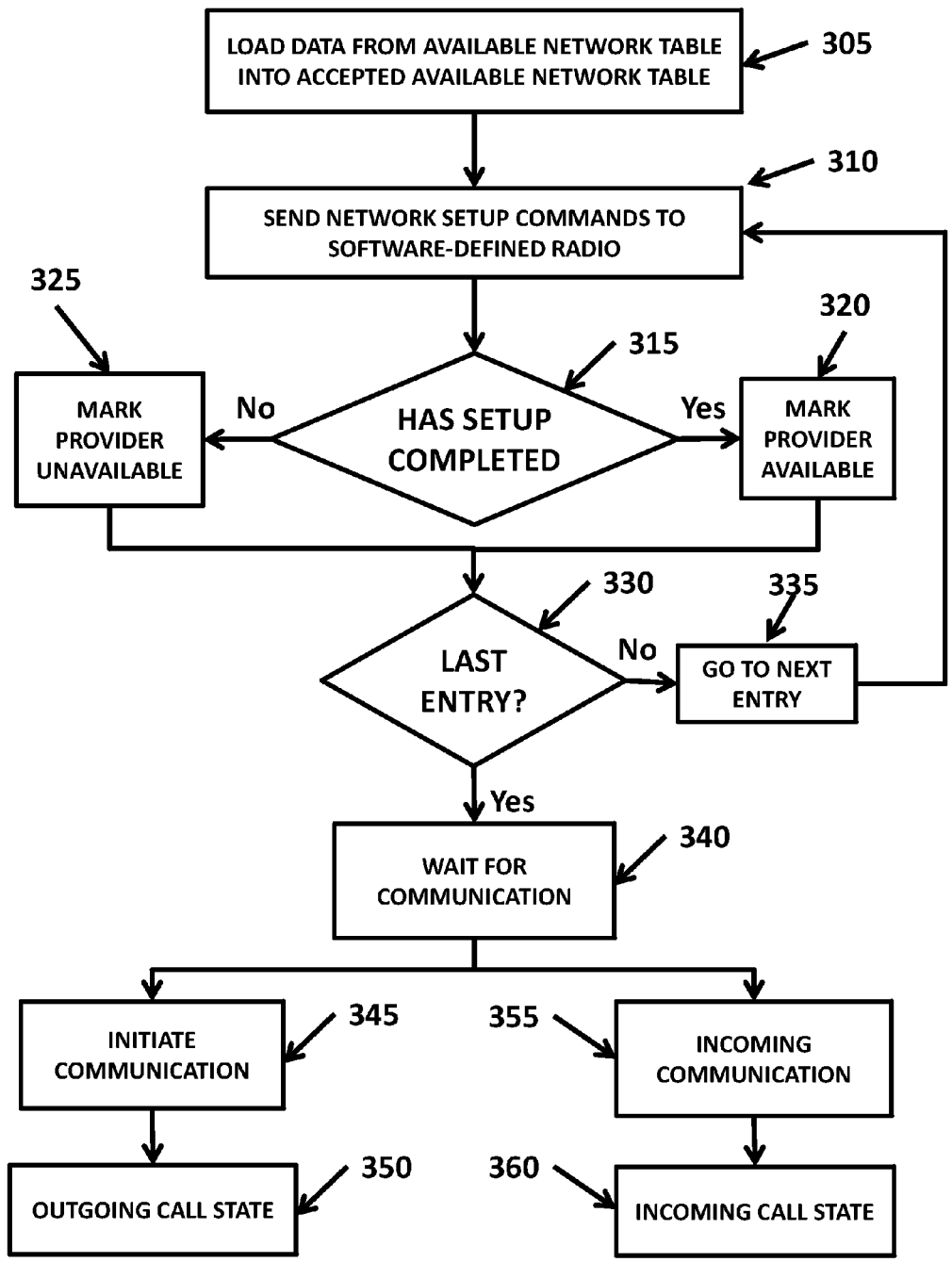
FIG. 3 is a flow diagram illustrating a method for establishing communications over a plurality of wireless networks according to at least one embodiment.
Figure 4:
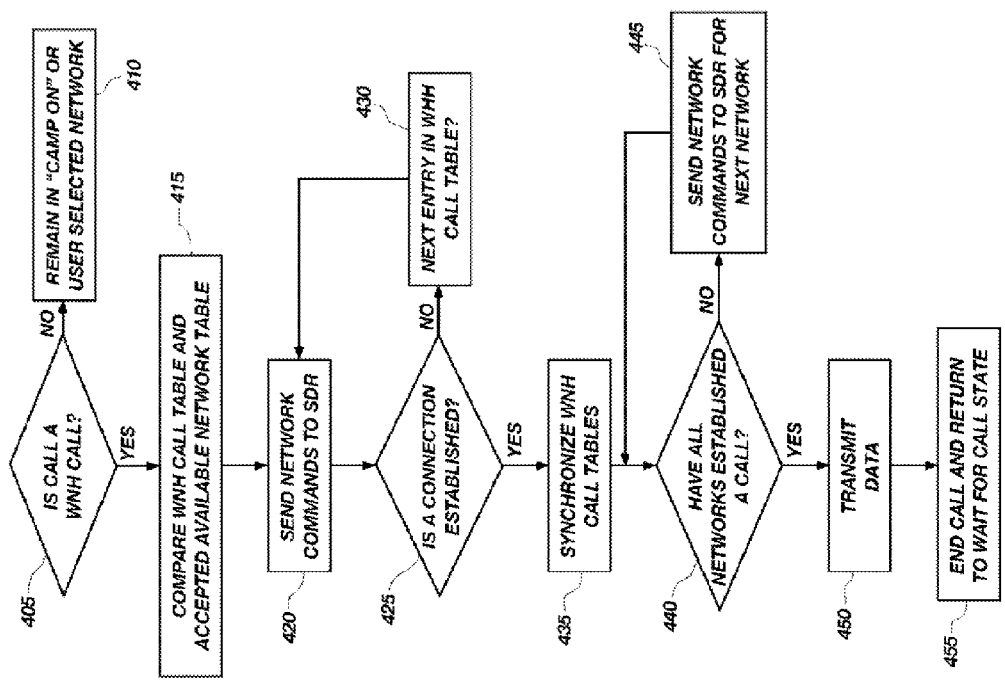
FIG. 4 is a flow diagram illustrating at least one embodiment of an outgoing call state for a wireless device.
Figure 5:
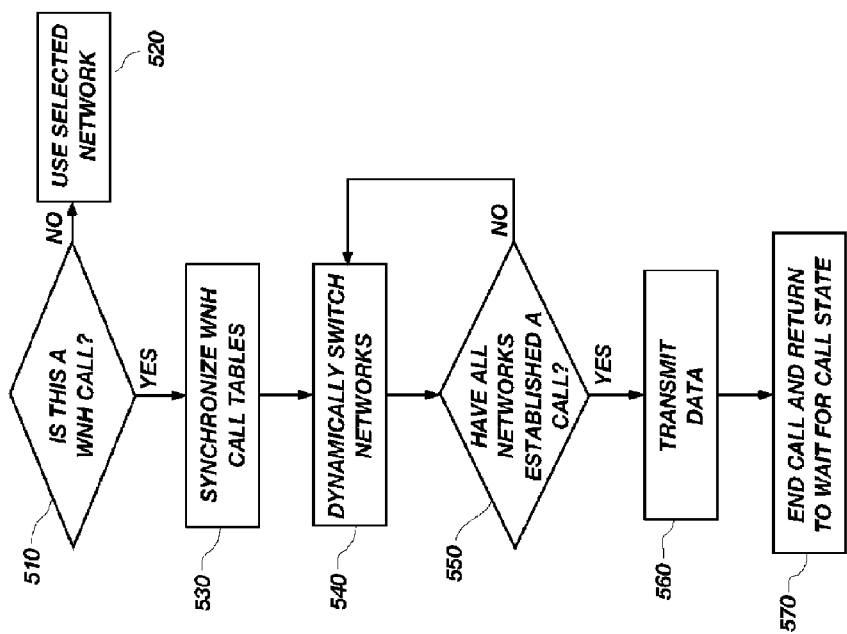
FIG. 5 is a flow diagram illustrating at least one embodiment of an incoming call state for a wireless device.

In use, many of the operations carried out by the wireless device may be implemented by programming instructions in the form of software, hardware, or firmware, as well as combinations thereof. FIGS. 3-5 illustrate flow diagrams of at least some embodiments of programming which may be included in at least some embodiments of a wireless device.

FIG. 3

FIG. 3 is a flow diagram illustrating at least one embodiment of a method for establishing communications over a plurality of wireless networks. In at least some embodiments, such methods may be implemented by programming stored to a wireless device. Initially, all the data relating to the registration and communication details for a plurality of networks contained within the available network table is loaded into the accepted available network table 305. For the first network in the accepted available network table, the network setup commands and configuration details included in the accepted available network table are communicated to the software-defined radio for configuring the software-defined radio to communicate with the first network 310.

It may be determined by the wireless device whether the software-defined radio has successfully completed the setup and registration with the selected network 315. If setup and registration is successful, then the selected network is identified as "available" in the accepted available network table 320. If, however, setup and registration is unsuccessful for the selected network, then that selected network is identified as "unavailable" in the accepted available network table 325.

After a successful or unsuccessful registration for the selected network, it may be determined whether the selected network is the last entry in the accepted available network table 330. If the selected network is not the last entry in the accepted available network table, the setup and registration commands for the next network 335 are sent to the software-defined radio to attempt establishing communications with the next network in the accepted available network table 310.

If the selected network is the last entry in the accepted available network table, the wireless device goes to a wait mode in which the wireless device is ready to receive or make a wireless communication 340. In some embodiments, the wireless device may comprise two wait modes, a wireless network-hopping wait mode and a camp on wait mode. In the wireless network-hopping mode, communications are sent to each network to keep the communication active. For example, programming in a wireless device may include an accepted available network table timer comprising a timer and information regarding how often to transmit keep-alive commands for each network in order to keep the wireless device registered on each available network. As the accepted available network table timer times out for each network, the keep-alive commands and configuration details are communicated to the software-defined radio, which transmits the commands to the network. In the camp on mode, the wireless device remains configured for a specific network and the keep-alive commands and configuration details sent to the software-defined radio relate only to that specific network.

When the wireless device is in the wait mode, a communication may be commenced from the wireless device or a communication may be received by the wireless device. By way of example and not limitation, a user may initiate communication 345 with one or more other communication devices by entering a device identifier 345, such as a phone number, and the wireless device may enter an outgoing call state 350. If an incoming communication, such as an incoming call, is received 355, the wireless device may be configured to enter an incoming call state 360.

FIG. 4

Turning to FIG. 4, a flow diagram is shown illustrating at least one embodiment of an outgoing call state for a wireless device. An outgoing communication may be initiated by entering a unique endpoint identifier, such as a phone number. In some embodiments, the unique endpoint identifier may comprise some name or other identification stored on the wireless device that is associated with all the information necessary for initiating a wireless network-hopping communication with each endpoint. For example, a wireless device may comprise a list of contacts configured to receive and participate in a wireless network-hopping communication. All the relevant phone numbers and/or other identifiers, as well as the associated wireless network call table information is stored for each of the contacts.

It may be determined, based on the endpoint identifier, whether or not the communication is a wireless network-hopping communication, also referred to herein as a wireless network hopping (WNH) call 405. In at least some embodiments, this may be determined based on the endpoint identifier selected. If the communication is not a wireless network-hopping communication, the wireless device may remain in the camp-on mode and use the selected network of the camp-on mode, or the wireless device may be configured to allow the user to select a particular network 410. When the communication is not a wireless network-hopping communication the wireless device will communicate over the same network for the entire time.

If the communication is a wireless network-hopping communication, the wireless device may compare the wireless network-hopping call table to the accepted available network table 415. As described herein, the wireless network-hopping call table may be different for each endpoint a user may call. Thus, the programming of the wireless device may compare the networks included in the wireless network-hopping call table with those of the accepted available network table to determine which of the networks in the wireless network-hopping call table are available at the time the call is initiated.

Starting with the first available network in the wireless network-hopping call table, the wireless device is configured to transmit the related setup commands, configuration details and place call commands to the software-defined radio 420. The software-defined radio may then attempt to establish a connection with the endpoint over the first network 425. If no connection is established, the wireless device may go to the next available network in the wireless network-hopping call table 430, transmitting the related setup commands, configuration details and place call commands to the software-defined radio 420. For example, the software-defined radio of the wireless device may be configured to use the first network to call the phone number associated with the endpoint on the first network. If no call is established (e.g., busy signal or voice mail), the software-defined radio of the wireless device may be reconfigured to use the next network to call the phone number associated with the endpoint on the next network. By way of a more specific example and not by way of limitation, the wireless device may use a first network (e.g., GSM on AT&T) to call the phone number (e.g., 555-555-5551) for another wireless device associated with the same network (GSM on AT&T). If no call is established, the wireless device may use a second network (e.g., GSM on T-Mobile) to call the phone number (e.g., 555-555-5552) for the other wireless device associated with the second network (GSM on T-Mobile).

When a connection is established with the identified endpoint over one of the networks in the wireless network-hopping call table, the wireless network-hopping call tables of the two wireless devices are synchronized 435. In other words, because the wireless network-hopping call table may include some networks that were not available to either or both of the wireless devices participating in the communications, and because the wireless network-hopping call table may include various permutations and sequences, the wireless network-hopping call tables must be synchronized to reflect only those networks which are available to each wireless device and to identify the hopping sequences and timing to be used for the current communication session. This may be done using the first network through which communications were established.

When the tables are synchronized, communications may be established through the remaining networks of the wireless network-hopping call table. Programming may query whether all networks have established a connection between the wireless devices 440. If not, the setup commands, configuration details and place call commands for the next network in the wireless network-hopping call table are communicated to the software-defined radio to establish a call 445. This step is repeated until all of the available networks have established communications between the two wireless devices. The wireless device is configured to keep communications active over each network as communications are established over each additional network.

With communications established between the wireless devices over a plurality of networks, data may be transmitted between the wireless devices 450. The wireless devices may include a wireless network-hopping call table entry timer associated with the wireless network-hopping call table for each device which may comprise programming configured to determine how much time that the software-defined radio will remain in the configuration for a particular network during an established communication between the devices. Thus, as data is communicated between the wireless devices, the software-defined radios of each device will continuously be reconfigured for a different network such that the data is communicated over at least some of the networks over the course of the communications. When the call is ended, a transmission may be sent to each network indicating that the call is ended and the wireless devices may return to the wait for call state 455, preferably "Wait For Communication" state 340 shown on FIG. 3.

FIG. 5

Turning to FIG. 5, a flow diagram is shown illustrating at least one embodiment of an incoming call state for a wireless device. When a transmission is received initiating a communication between two wireless devices, the wireless device receiving the transmission may determine whether the communication is a wireless network-hopping communication 510. This may be identified by the identifier, such as the phone number, of the initiating device. For example, if the device used to call the wireless device is known to the wireless device as comprising a wireless network-hopping device, then the communications may be set up as a wireless network-hopping communication. If the communication is not a wireless network-hopping communication, the wireless device may remain in the selected network in which the original transmission is received for the entire course of the communications 520.

If the communication is a wireless network-hopping communication, then the wireless device may synchronize the wireless network-hopping call table with the wireless network-hopping call table of the initiating device 530. As described above, the wireless network-hopping call table is previously loaded into the wireless devices and predefined as the wireless network-hopping call table for communications between the two respective devices before the wireless devices are used for communications. With the wireless network-hopping call tables synchronized, the receiving wireless device is configured to switch to the next network in the wireless network-hopping call table to await the call from the initiating device 540.

The wireless device may determine whether all of the networks in the wireless network-hopping call table have been employed to establish communications between the wireless devices 550. If not, the receiving wireless device switches to the next network in the wireless network-hopping call table to await a call from the initiating wireless device. As communications are established on each of the networks, the wireless device is also transmitting the necessary keep-alive commands to those networks through which communications are already established.

With communications established between the wireless devices over a plurality of networks, data may be transmitted between the wireless devices 560. The wireless devices may include a wireless network-hopping call table entry timer associated with the wireless network-hopping call table for each device which may comprise programming configured to determine how much time that the software-defined radio of each wireless device will remain configured for a particular network during ongoing communications between the devices. Thus, as data is communicated between the wireless devices, the software-defined radios of each device will continuously be reconfigured for a different network such that the data is communicated over at least some of the networks over the course of the communications. When the call is ended, a transmission may be sent to each network indicating that the call is ended and the wireless devices may return to the wait for call state 570, preferably "Wait For Communication" state 340 shown on FIG. 3.

Additional embodiments of the present invention are directed toward methods of wireless communications. In at least some embodiments, methods of communicating with a wireless device may comprise transmitting data to or from a wireless device with a first communication network for a predetermined amount of time. A second communication network may then be selected and data may be transmitted to or from the wireless device with the second communication network for another predetermined amount of time. Likewise, any number of communication networks may be selected for data transmission for a corresponding predetermined amount of time. Preferably, the predetermined amount of time is optimized for the communications network used. Preferably, the predetermined amount of time is configurable through a user interface, whereby the user, communications provider, or servicer may configure the communication device. In an alternate embodiment, the predetermined amount of time is set during manufacture. In one embodiment, each predetermined amount of time for data transmission is equal. In an alternative embodiment, one or more predetermined amounts of time may differ from another. In at least some embodiments, the data may be encrypted prior to transmission on each of the plurality of communication networks. A connection may be established with the wireless device on the first communication network and the second communication network such that the connection with the wireless device occurs over all the communication networks at least substantially concurrently. Furthermore, a connection may be established with the wireless device on additional communication networks with the connection with the wireless device occurring at least substantially simultaneously.

Preferably, a plurality of software-defined radios are used to reduce the amount of time used waiting for a software-defined radio to configure itself for a given network and establish a connection. Therefore, preferably, a plurality, more preferably six, software-defined radios are used. Preferably, while the first software-defined radio is transmitting the next software-defined radio is already setup for transmission, whereby once the first software-defined radio has completed transmitting a data packet, the next software radio is already configured and has an established connection and is ready to begin data transmission.

FIG. 6

Figure 6:
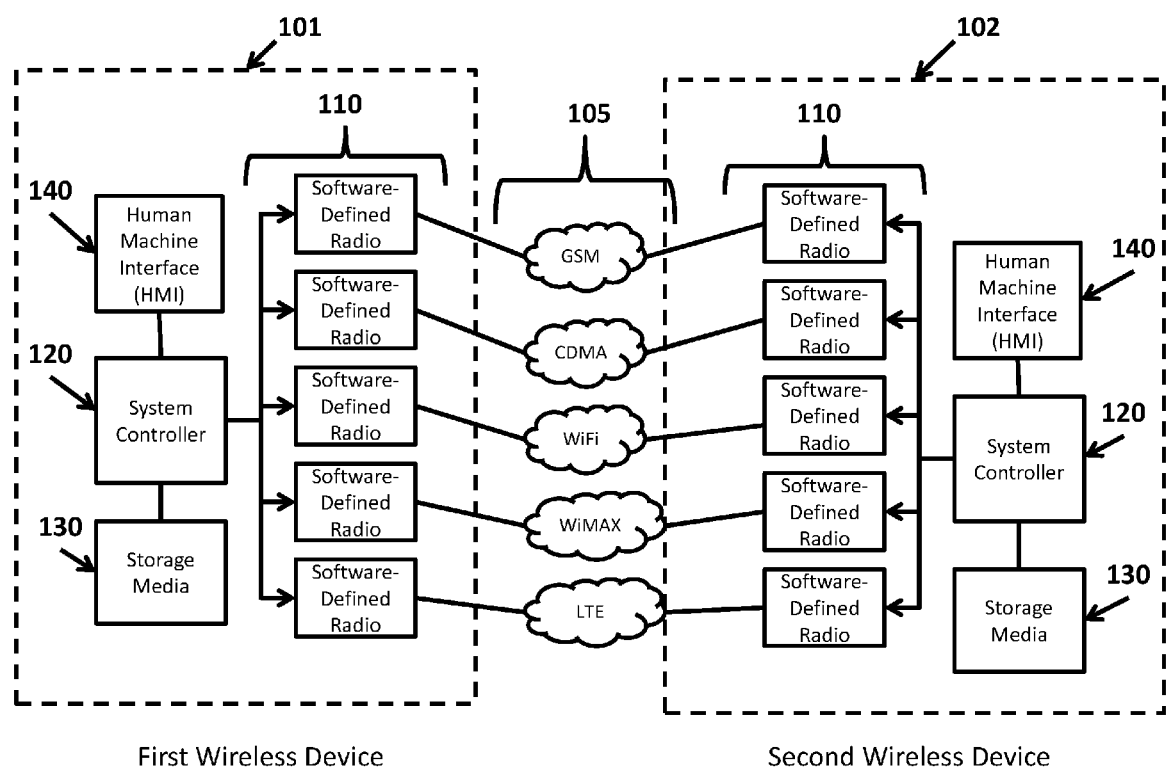
FIG. 6 is a flow diagram illustrating communication operation and components according to at least one embodiment having a plurality of software-defined radios.

Turning to FIG. 6, a flow diagram illustrating communication operation and components according to at least one embodiment having a plurality of software-defined radios 110. For simplicity, only a first wireless device 101 and a second wireless device 102 are shown, however any number of wireless devices may be used in various configurations. Both the first wireless device 101 and the second wireless device 102 each comprise a plurality of software-defined radios 110, a system controller 120, a storage media 130, and a human machine interface (HMI) 140, as described above. In this embodiment, multiple software-defined radios 110 are each programmed to use a wireless network from the plurality of wireless networks 105. Each software-defined radio 110 is setup to use a particular communication technology over a particular wireless network 105 for the entire communication session, whereby each software-defined radio 110 is "camped-on."

Once the connection between the wireless devices is established for each of the plurality of networks, the wireless devices (first wireless device 101 and second wireless device 102) may commence in transmitting and receiving data. For example, data from the human-machine interface 140 of a wireless device preferably passes data from the human machine interface 140 to its corresponding system controller 120. The system controller 120 then, possibly after storage in its corresponding storage media 130, passes the data to one of its corresponding software-defined radios 110 for transmission.

Each software-defined radio 110 has its own set of tables for all of the available networks, phone numbers and calling sequences. As the system controller 120 passes data to one of the software-defined radios 110, the software-defined radio 110 in turn passes the data to the network that it has been "camped on." With multiple software-defined radios 110 the system controller 120 will pass the next data packet to a different software-defined radio 110 of the wireless device, which in turn passes the data to the network that it has been "camped on". The system controller 120 cycles through each of its software-defined radio 110, preferably six software-defined-radios 110, and continues to transmit, receive, or a combination thereof data. Preferably, each software-defined radio 110 remains "camped on" to a particular wireless network for the entire duration of the communications session, unless the connection is lost. Preferably, if communications is interrupted and cannot be reestablished for a software-defined radio 110, it is "camped-on" a different wireless network.

When a wireless device receives data, the operation is reversed with the software-defined radios 110 receiving the information and passing it on to the system controller 120 and finally on to the human-machine interface 140. This embodiment is preferred as it may provide increases data transmission rate over using a single software-defined radio 110 because the system controller 120 does not have to wait for a software-defined radio 110 to setup for a different network before it can accept the next data packet, since it is always "camped on" to a network. Also each software-defined radio 110 does not have to always be setup for a particular network because the number of available networks will vary. For example, a first software-defined radio from the plurality of software-defined radios 110 may be set for a GSM network but may change to a WIFI™ network for a different communication session.

FIG. 7

Figure 7:
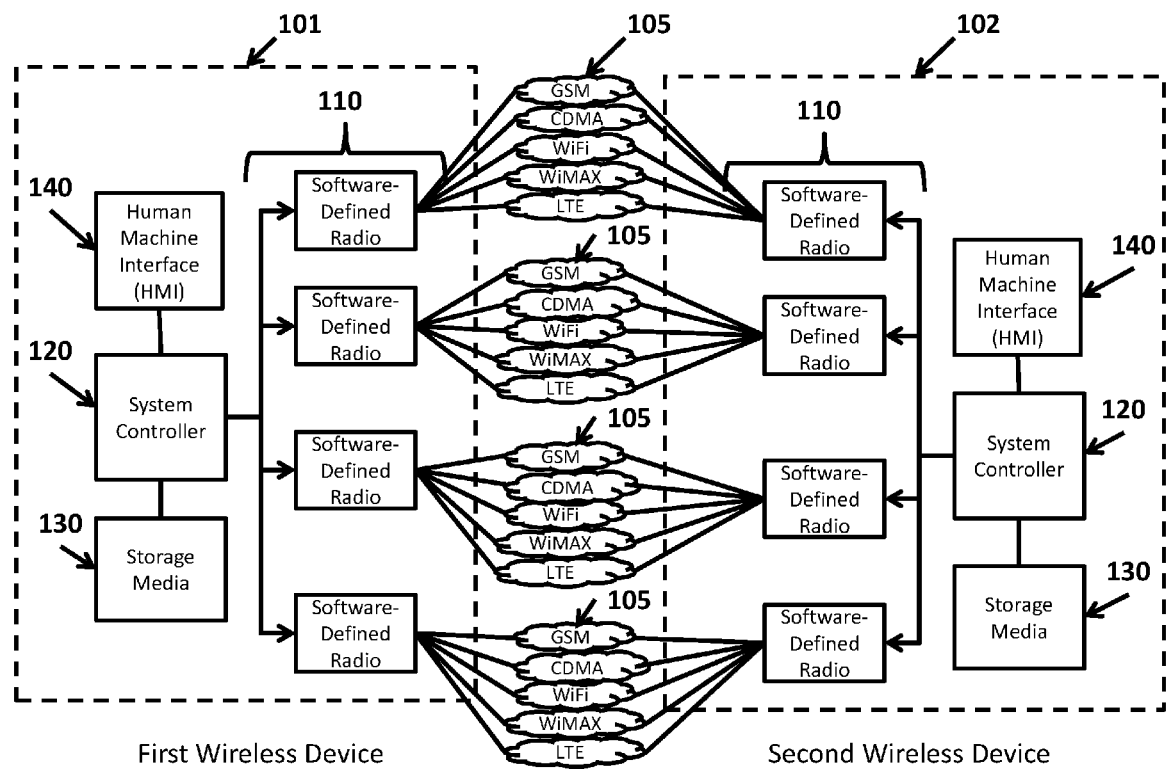
FIG. 7 is a flow diagram illustrating communication operation and components according to one embodiment having a plurality of software-defined radios, with each software-defined radio using a plurality of communication networks.

Turning to FIG. 7, a flow diagram illustrating communication operation and components according to one embodiment having a plurality of software-defined radios, with each software-defined radio using a plurality of communication networks. For simplicity, only a first wireless device 101 and a second wireless device 102 are shown, however any number of wireless devices may be used in various configurations. Both the first wireless device 101 and the second wireless device 102 each comprise a plurality of software-defined radios 110, a system controller 120, a storage media 130, and a human machine interface (HMI) 140, as described above. In this embodiment, multiple software-defined radios 110 are each programmed to use a plurality of wireless networks 105. Each software-defined radio 110 is setup to use one or more communication technologies over a plurality of wireless networks 105 for the entire communication session.

Once the connection between the wireless devices is established for each of the plurality of networks, the wireless devices (first wireless device 101 and second wireless device 102) may commence in transmitting and receiving data. For example, data from the human-machine interface 140 of the first wireless device 101 preferably passes data from the human machine interface 140 to the system controller 120 of the first wireless device 101. The system controller 120 then, possibly after storage in the storage media 130, passes the data to one of the software-defined radios 110 for transmission.

Each software-defined radio 110 has its own set of tables for all of the available networks, phone numbers and calling sequences. As the system controller 120 passes data to one of the software-defined radios 110, the software-defined radio 110 in turn passes data to its currently connected wireless network. Preferably, the system controller 120 cycles through each of its software-defined radio 110, preferably six software-defined-radios 110, and continues to transmit, receive, or a combination thereof data.

When a wireless device receives data, the operation is reversed with the software-defined radios 110 receiving the information and passing it on to the system controller 120 and finally on to the human-machine interface 140. In one embodiment, one or more of the plurality of software defined radios 110 of the same wireless device, transmit, receive, or a combination thereof data simultaneously, thereby increasing the data transfer rate of the wireless device. Preferably, while a software-defined radio is transmitting, receiving, or a combination thereof data the system controller 120 configures the next software-defined radio 110 whereby the system controller 120 does not have to wait to transmit, receive, or a combination thereof data while a particular software-defined radio 110 is configured.

In one preferred embodiment for enhanced data transfer throughput, a plurality of the software defined radios 110 of the same wireless device, transmit, receive, or a combination thereof data simultaneously. In this embodiment, preferably each software-defined radio 110 in-turn changes communication networks network. This embodiment is preferred as the system maintains a maximum throughput, while also maintaining security by rotating network communications.

In one preferred embodiment for further enhanced security, a plurality of the software defined radios 110 of the same wireless device, transmit, receive, or a combination thereof data simultaneously. In this embodiment, preferably each software-defined radio 110 continuously changes communication networks network regardless of the status of the other software-defined radios 110. This embodiment is preferred as it encourages network hopping, which provides for enhanced security as data is transmitted over more communication networks in preferably smaller data packets.

FIG. 8

Figure 8:
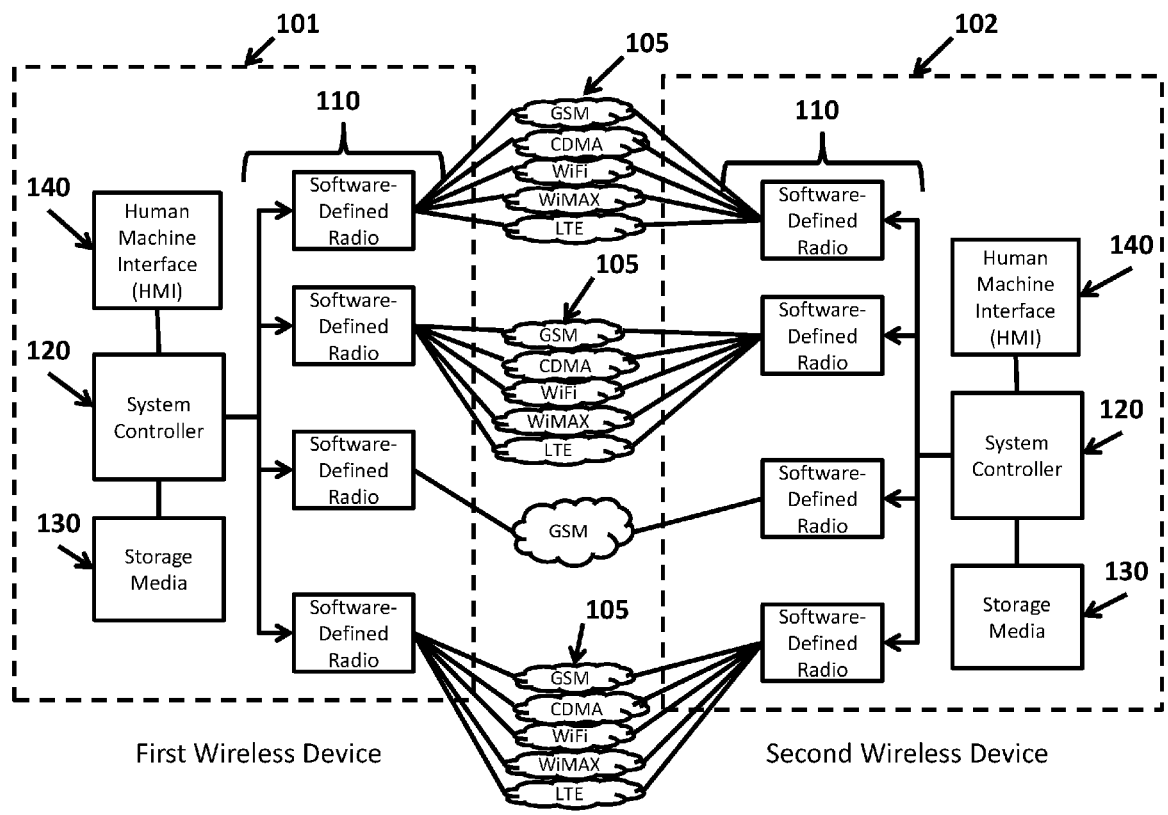
FIG. 8 is a flow diagram illustrating communication operation and components according to one embodiment having a plurality of software-defined radios, with a portion of the software-defined radio using a plurality of communication networks.

Turning to FIG. 8, illustrating communication operation and components according to one embodiment having a plurality of software-defined radios, with a portion of the software-defined radio using a plurality of communication networks. For simplicity, only a first wireless device 101 and a second wireless device 102 are shown, however any number of wireless devices may be used in various configurations. Both the first wireless device 101 and the second wireless device 102 each comprise a plurality of software-defined radios 110, a system controller 120, a storage media 130, and a human machine interface (HMI) 140, as described above.

However, the embodiment, in FIG. 8 depicts only a portion of the software defined radios 110 using a plurality of wireless communications. In this embodiment, one or more of the software-defined radios 110, are "camped-on", whereby during a communication session, the wireless network of one or more of the software-defined radios 110 does not change, unless the connection is lost. Preferably, if communications is interrupted and cannot be reestablished for a software-defined radio 110 that is "camped-on," the software-defined radio 110 is directed to connect to a different wireless network until a connection is established. This embodiment, in some ways is a combination of the embodiments shown in FIG. 6 and FIG. 7.

FIG. 9

Figure 9:
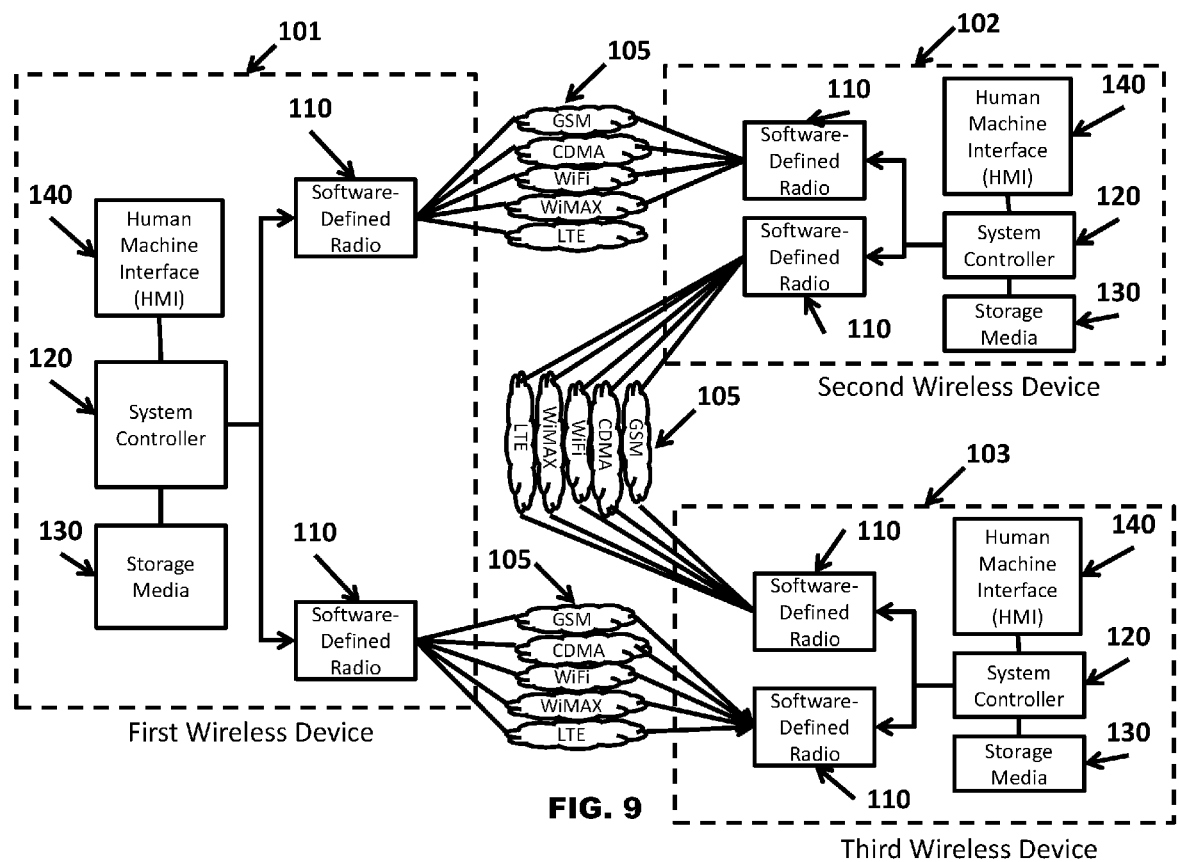
FIG. 9 is a flow diagram illustrating communication operation and components according to one embodiment having three wireless devices each using a plurality of software-defined radios, with each software-defined radio using a plurality of communication networks.

FIG. 9 is a flow diagram illustrating communication operation and components according to one embodiment having three wireless devices each using a plurality of software-defined radios, with each software-defined radio using a plurality of communication networks. For simplicity, only a first wireless device 101, a second wireless device 102, and a third wireless device 103 are shown, however any number of wireless devices may be used in various configurations. The first wireless device 101, the second wireless device 102, and the third wireless device each comprise a plurality of software-defined radios 110, a system controller 120, a storage media 130, and a human machine interface (HMI) 140, as described above in FIG. 6. The number of software-defined radios 110 shown for each device are exemplarily, as any number, including a single software-defined radio 110, may be used in any wireless device. In this embodiment, multiple software-defined radios 110 are each programmed to use a plurality of wireless networks 105. Each software-defined radio 110 is setup to use one or more communication technologies over a plurality of wireless networks 105 for the entire communication session.

Once the connection between the wireless devices is established for each of the plurality of networks, the wireless devices (first wireless device 101, second wireless device 102, and third wireless device 103) may commence in transmitting and receiving data. For example, data from the human-machine interface 140 of the first wireless device 101 preferably passes data from the human machine interface 140 to the system controller 120 of the first wireless device 101. The system controller 120 then, possibly after storage in the storage media 130, passes the data to one of the software-defined radios 110 for transmission.

As shown in FIG. 9, the first wireless device 101 communicates with the third wireless device 103 using any number of software-defined radios 110, although one is showed for simplify. Information received by the second wireless device 102 that is destined for the third wireless device 103, is preferably forwarded by the system controller 120 of the second wireless device 102 to the third device 103. Likewise, information received by the second wireless device 102 that is destined for the first wireless device 101, is preferably forwarded by the system controller 120 of the second wireless device 102 to the first wireless device 101. In one embodiment, any number of wireless devices are configured to forward communications to various devices. Preferably, communications include a heading comprising an indicator for desired destination. In this embodiment, preferably each wireless device has a routing table, whereby known destinations can be directly routed, and default routes (e.g. internet) to route data using unknown networks.

In one embodiment, the third wireless device 103 is used only for forwarding communications, and therefore the Human Machine Interface 140 is omitted. Preferably, in this embodiment, the wireless device 103 is configured using a wireless device programmer during initial setup and afterwards left with no human machine interface 140. This embodiment is preferred for providing lower cost forwarding equipment, for example, routers, extenders, etc.

Each software-defined radio 110 has its own set of tables for all of the available networks, phone numbers and calling sequences. As the system controller 120 passes data to one of the software-defined radios 110, the software-defined radio 110 in turn passes data to the wireless network that it is currently connected to. Preferably, the system controller 120 cycles through each of its software-defined radio 110, preferably six software-defined-radios 110, and continues to transmit, receive, or a combination thereof data.

When a wireless device receives data, the operation is reversed with the software-defined radios 110 receiving the information and passing it on to the system controller 120 and finally on to the human-machine interface 140. In one embodiment, one or more of the plurality of software defined radios 110 of the same wireless device, transmit, receive, or a combination thereof data simultaneously, thereby increasing the data transfer rate of the wireless device. Preferably, while the first software-defined radio is transmitting, receiving, or a combination thereof data the system controller 120 configures the next software-defined radio 110 whereby the system controller 120 does not have to wait to transmit, receive, or a combination thereof data while a particular software-defined radio 110 is configured.

Preferably, this embodiment for increased security when there is concern of a interception communication between two different wireless devices. The additional wireless device may be used to conceal key parts of a communication, which is preferably encrypted.

In at least some additional embodiments, methods of wireless communications may include methods of wireless network-hopping. Embodiments of such methods may comprise establishing a connection between at least two communication devices on a plurality of wireless networks. Data may be transmitted between each of the communication devices using a first wireless network of the plurality of wireless networks for a set amount of time. Subsequently, data may be transmitted between the communication devices using another wireless network of the plurality of wireless networks for another set amount of time. Similarly, each wireless network of the plurality of wireless networks may be used for transmitting data between the communication devices.

In at least some embodiments, establishing a connection between the communication devices may include establishing communications between the at least two communication devices on the first network. For example, a software-defined radio of one communication device may be configured to establish a connection with the other communication device on a first wireless network. This may be carried out by configuring the software-defined radio of the one communication device to call a telephone number associated with the other communication device on a specific wireless network. The wireless network-hopping call table associated with communications between the two or more communication devices may be synchronized to identify each of the wireless networks which are available for use. With the wireless network-hopping call tables synchronized, connections may be established between the communication devices on each remaining wireless network of the plurality. In at least some embodiments, the subsequent connections may be established by reconfiguring the software-defined radio of the one communication device to call a telephone number or other identifier associated with the other communication device on each of the remaining wireless networks.

Although in the above embodiments, communications between wireless devices may be described in which the wireless devices communicate simultaneously over the same network, in at least some embodiments the wireless devices may communicate between differing networks. For example, a first wireless device may transmit data over a GSM network and the second wireless device may receive the data over a CDMA network. The first wireless device may switch to a WIFI™ network for transmitting data to be received by the second wireless device over a GSM network. As will be understood by those of ordinary skill in the art, a variety of configurations and patterns are possible and are contemplated.

Furthermore, although the above embodiments may describe communications between two or more wireless devices, embodiments of the present invention may be implemented with communications between one or more wireless devices and another communication device, such as a conventional land-line telephone. For example, a wireless device may employ the plurality of networks for establishing a call with a land-line telephone which may have only a single telephone number or a plurality of telephone numbers associated therewith. In at least some embodiments, the land-line telephone may use a conference calling feature to simultaneously communicate to the wireless device using each of the plurality of networks, even though the wireless device only communicates on one network at a time. In other embodiments, the other communication device may also be configured to hop between each network of the plurality of networks in the same sequence as the wireless device, as described above.

Thus, while certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and legal equivalents, of the claims which follow.

What is claimed is:

1. A method of communicating data, comprising:
a) communicating data with a first wireless device using a first communication network for a first predetermined amount of time;
b) subsequently communicating data with said first wireless device using a second communication network for a second predetermined amount of time;
c) said step of communicating data with said first wireless device using said first communication network comprises communicating data through a first software-defined radio;
d) said step of subsequently communicating data with said first wireless device using said second communication network comprises communicating data through a second software-defined radio;
e) establishing a first connection with said first communication device on said first communication network using said first software-defined radio, prior to said step of communicating data with said first wireless device using said first communication network;
f) synchronizing a communication network-hopping call table with said first communication device, using said first established connection; said communications network-hopping call table comprising a plurality of communication networks; said plurality of communication networks comprising said second communication network;
g) establishing a second connection with said first communication device on said second communication network using said first software-defined radio, prior to said step of subsequently communicating data with said first wireless device using said second communication network; and
h) establishing one or more third connections with said first communication device on one or more remaining communication network from said communication network-hopping call table using said first software-defined radio.

2. The method of claim 1, further comprising establishing a plurality of concurrent connections with said first wireless device using said first communication network and said second communication network prior to said step of communicating data with said first wireless device and said step of subsequently communicating data with said first wireless device.

3. The method of claim 1, wherein:
   a) said step of communicating data with said first wireless device using said first communication network comprises communicating data with said first wireless device using a communication technology selected from said list of communication technologies consisting of GSM, CDMA, WiFi, WiMAX, LTE, CDMA2000, WCDMA, TD-SCDMA, and WiBRO; and
   b) said step of subsequently communicating data with said first wireless device using said second communication network comprises communicating data with said first wireless device using a communication technology selected from said list of communication technologies consisting of GSM, CDMA, WiFi, WiMAX, LTE, CDMA2000, WCDMA, TD-SCDMA, and WiBRO.

4. The method of claim 1, further comprising:
   a) said step of subsequently communicating data with said first wireless device using said second communication network comprises encrypting data sent to said first wireless device; and
   b) said step of subsequently communicating data with said first wireless device using said second communication network comprises decrypting data received from said first wireless device.

5. The method of claim 1, further comprising:
   a) communicating data with a second wireless device using a third communication network comprising receiving data from said second wireless device; and
   b) said step of subsequently communicating data with said first wireless device using said second communication network comprises transmitting said received data to said first wireless device.

6. A method of communicating data comprising:
   a) communicating data with a first wireless device using a first communication network for a first predetermined amount of time;
   b) subsequently communicating data with said first wireless device using a second communication network for a second predetermined amount of time;
   c) said step of communicating data with said first wireless device using said first communication network comprises communicating data through a first software-defined radio;
   d) said step of subsequently communicating data with said first wireless device using said second communication network comprises communicating data through a second software-defined radio;
   g) establishing a first connection with said first communication device on said first communication network using said first software-defined radio, prior to said step of communicating data with said first wireless device;
   h) synchronizing a communication network-hopping call table with said first communication device, using said first established connection; said communications network-hopping call table comprising a plurality of communication networks; said plurality of communication networks comprising said second communication network; and
   i) establishing a second connection with said first communication device on said second communication network using said second software-defined radio, prior to said step of subsequently communicating data with said first wireless device.

7. The method of claim 6, further comprising establishing a plurality of concurrent connections with said first wireless device using said first communication network and said second communication network prior to said step of communicating data with said first wireless device and said step of subsequently communicating data with said first wireless device.

8. The method of claim 6, wherein:
   a) said step of communicating data with said first wireless device using said first communication network comprises communicating data with said first wireless device using a communication technology selected from said list of communication technologies consisting of GSM, CDMA, WiFi, WiMAX, LTE, CDMA2000, WCDMA, TD-SCDMA, and WiBRO; and
   b) said step of subsequently communicating data with said first wireless device using said second communication network comprises communicating data with said first wireless device using a communication technology selected from said list of communication technologies consisting of GSM, CDMA, WiFi, WiMAX, LTE, CDMA2000, WCDMA, TD-SCDMA, and WiBRO.

9. The method of claim 6, further comprising:
   a) said step of subsequently communicating data with said first wireless device using said second communication network comprises encrypting data sent to said first wireless device; and
   b) said step of subsequently communicating data with said first wireless device using said second communication network comprises decrypting data received from said first wireless device.

10. The method of claim 6, further comprising:
    a) communicating data with a second wireless device using a third communication network comprising receiving data from said second wireless device; and
    b) said step of subsequently communicating data with said first wireless device using said second communication network comprises transmitting said received data to said first wireless device.

11. A method of communicating data comprising:
    a) communicating data with a first wireless device using a first communication network for a first predetermined amount of time;
    b) subsequently communicating data with said first wireless device using a second communication network for a second predetermined amount of time;
    c) said step of communicating data with said first wireless device using said first communication network comprises communicating data through a first software-defined radio;
    d) said step of subsequently communicating data with said first wireless device using said second communication network comprises communicating data through a second software-defined radio;
    e) reconfiguring said first software-defined radio to communicate data with said first wireless device on at least a third communication network;
    f) reconfiguring said second software-defined radio to communicate data with said first wireless device on at least a fourth communication network;
    g) subsequently communicating data with said first wireless device using said third communication network for a third predetermined amount of time;
    h) subsequently communicating data with said first wireless device using said fourth communication network for a fourth predetermined amount of time;

m) establishing a first connection with said first communication device on said first communication network using said first software-defined radio;
n) synchronizing a communication network-hopping call table with said first communication device, using said first established connection; said communications network-hopping call table comprising a plurality of communication networks; said plurality of communication networks comprising said second communication network, said third communication network, and said fourth communication network;
o) establishing a second connection with said first communication device on said second communication network using said second software-defined radio prior to said step of communicating data with said first wireless device using said second communication network;
p) establishing a third connection with said first communication device on said third communication network using said first software-defined radio prior to said step of communicating data with said third wireless device using said first communication network; and
q) establishing a fourth connection with said first communication device on said fourth communication network using said second software-defined radio prior to said step of communicating data with said fourth wireless device using said first communication network.

12. The method of claim 11, further comprising establishing a plurality of concurrent connections with said first wireless device using said first communication network and said second communication network prior to said step of communicating data with said first wireless device and said step of subsequently communicating data with said first wireless device.

13. The method of claim 11, whereby:
a) said step of communicating data with said first wireless device using said first communication network comprises communicating data with said first wireless device using a communication technology selected from said list of communication technologies consisting of GSM, CDMA, WiFi, WiMAX, LTE, CDMA2000, WCDMA, TD-SCDMA, and WiBRO;
b) said step of subsequently communicating data with said first wireless device using said second communication network comprises communicating data with said first wireless device using a communication technology selected from said list of communication technologies consisting of GSM, CDMA, WiFi, WiMAX, LTE, CDMA2000, WCDMA, TD-SCDMA, and WiBRO;
c) said step of subsequently communicating data with said first wireless device using said third communication network comprises communicating data with said first wireless device using a communication technology selected from said list of communication technologies consisting of GSM, CDMA, WiFi, WiMAX, LTE, CDMA2000, WCDMA, TD-SCDMA, and WiBRO; and
d) said step of subsequently communicating data with said first wireless device using said fourth communication network comprises communicating data with said first wireless device using a communication technology selected from said list of communication technologies consisting of GSM, CDMA, WiFi, WiMAX, LTE, CDMA2000, WCDMA, TD-SCDMA, and WiBRO.

14. The method of claim 11, further comprising:
a) said step of subsequently communicating data with said first wireless device using said second communication network comprises encrypting data sent to said first wireless device; and
b) said step of subsequently communicating data with said first wireless device using said second communication network comprises decrypting data received from said first wireless device.

15. The method of claim 11, further comprising:
a) communicating data with a second wireless device using a third communication network comprising receiving data from said second wireless device; and
b) said step of subsequently communicating data with said first wireless device using said second communication network comprises transmitting said received data to said first wireless device.

16. A method of communicating data comprising:
a) communicating data with a first wireless device using a first communication network for a first predetermined amount of time;
b) subsequently communicating data with said first wireless device using a second communication network for a second predetermined amount of time;
c) said step of communicating data with said first wireless device using said first communication network comprises communicating data through a first software-defined radio;
d) said step of subsequently communicating data with said first wireless device using said second communication network comprises communicating data through a second software-defined radio;
e) reconfiguring said second software-defined radio to communicate data with said first wireless device on at least a third communication network;
f) subsequently communicating data with said first wireless device using said third communication network for a third predetermined amount of time;
g) said step of synchronizing a communication network-hopping call table further comprises synchronizing said communication network-hopping call table with a plurality of communication networks comprising a fourth communication network with said first communication device;
h) after detecting a dropped connection of said first established connection with said first communication device on said first communication network:
  i) reconfiguring said second software-defined radio to communicate data with said first wireless device on at least a fourth communication network; and
i) establishing a connection with said first communications device on said fourth communications network using said first software-defined radio prior to said step of communicating data with said first wireless device using said fourth communication network.

17. The method of claim 16, further comprising:
a) said step of communicating data with said first wireless device using said first communication network comprises communicating data with said first wireless device using a communication technology selected from said list of communication technologies consisting of GSM, CDMA, WiFi, WiMAX, LTE, CDMA2000, WCDMA, TD-SCDMA, and WiBRO;
b) said step of subsequently communicating data with said first wireless device using said second communication network comprises communicating data with said first wireless device using a communication technology selected from said list of communication technologies consisting of GSM, CDMA, WiFi, WiMAX, LTE, CDMA2000, WCDMA, TD-SCDMA, and WiBRO;
c) said step of subsequently communicating data with said first wireless device using said third communication network comprises communicating data with said first wireless device using a communication technology selected from said list of communication technologies consisting of GSM, CDMA, WiFi, WiMAX, LTE, CDMA2000, WCDMA, TD-SCDMA, and WiBRO;
d) synchronizing a communication network-hopping call table with said first communication device, using said first established connection; said communications network-hopping call table comprising a plurality of communication networks; said plurality of communication networks comprising said second communication network, and said third communication network;
e) establishing a first connection with said first communication device on said first communication network using said first software-defined radio prior to said step of communicating data with said first wireless device using said first communication network;
f) establishing a second connection with said first communication device on said second communication network using said second software-defined radio prior to said step of communicating data with said first wireless device using said second communication network; and
g) establishing a third connection with said first communication device on said third communication network using said second software-defined radio prior to said step of communicating data with said first wireless device using said third communication network.

18. A wireless communication device, comprising:
a) one or more software-defined radios;
b) each said software-defined radios capable of communication over a plurality of communication technologies;
c) a system controller coupled to each said software-defined radio;
d) said system controller selected from the group of system controllers consisting of a general purpose processor, a digital signal processor (DSP), an application specific integrated circuit (ASIC), a field programmable gate array (FPGA), programmable logic component, discrete gate or transistor logic, discrete hardware components, or any combination thereof; and
e) a storage media coupled to said system controller and comprising a computer programming code configured to cause said system controller to configure and reconfigure at predefined intervals said one or more software-defined radios to operate using at least a subset of said plurality of communication networks according to a selected sequence defined in at least one wireless network-homing call table.

19. The wireless communication device of claim 18 further comprising:
a) said one or more software-defined radios comprises a plurality of software-defined radios; and
b) said computer programming code configured to cause said system controller to configure and reconfigure at least one of said software-defined radio to operate using a single communication network during a communications session while connected.

20. The wireless communication device of claim 19 further comprising:
a) said one or more software-defined radios comprises a plurality of software-defined radios;
b) said computer programming code configured to cause said system controller to configure and reconfigure at least one of said software-defined radio to operate using a plurality of communication networks during a communications session while connected; and
c) said computer programming code configured to forward an incoming communication from a first wireless communication device to a second wireless communication device.

21. The wireless communication device of claim 18 further comprising:
a) said one or more software-defined radios comprises a plurality of software-defined radios; and
b) said computer programming code configured to cause said system controller to configure and reconfigure at least one of said software-defined radio to operate using a plurality of communication networks during a communications session while connected.

22. The wireless communication device of claim 18 further comprising:
a) said computer programming code configured to forward an incoming communication from a first wireless communication device to a second wireless communication device.

* * * * *